United States Patent [19]

Phelps et al.

[11] Patent Number: 5,218,522

[45] Date of Patent: Jun. 8, 1993

[54] D.C. CHOPPER REGULATING METHOD AND APPARATUS INCORPORATING BILATERAL REGULATING VOLTAGE PATH

[75] Inventors: Thomas K. Phelps, Torrance; Khanh T. Le, Fountain Valley; Gilbert I. Cardwell, Jr., Palos Verdes Peninsula, all of Calif.

[73] Assignee: Hughes Aircraft Company, Los Angeles, Calif.

[21] Appl. No.: 845,074

[22] Filed: Mar. 3, 1992

[51] Int. Cl.$^5$ .............................. H02M 3/337
[52] U.S. Cl. .................... 363/124; 363/24; 363/25; 363/71
[58] Field of Search ............ 363/24, 25, 43, 49, 363/71, 72, 97, 124, 133; 323/263

[56] References Cited

U.S. PATENT DOCUMENTS

4,698,742 10/1987 Jones et al. ............... 363/124
4,943,903  7/1990 Cardwell, Jr. ............. 363/97

Primary Examiner—Emanuel T. Voeltz
Attorney, Agent, or Firm—Terje Gudmestad; Jeannette M. Walder; W. K. Denson-Low

[57] ABSTRACT

An unregulated D.C. input voltage ($V_{IN}$) is processed by a high power chopper (34,36) to produce a first chopped signal having the same voltage as the input ($V_{IN}$), and by a low power chopper (56,58) to produce a second chopped signal in synchronism with and having a lower voltage than the first chopped signal. The first and second chopped signals are algebraically combined by transformers (52,54) to produce an A.C. output signal which may be converted to D.C. ($V_{OUT}$). The second chopped signal may be controlled to have the same polarity relative to the first chopped signal in which case the voltages add to increase the output voltage ($V_{OUT}$), or to have the opposite polarity relative to the first chopped signal in which case the voltages subtract to decrease the output voltage ($V_{OUT}$). The periods of addition and subtraction are alternated within the period of the first chopped signal. The ratio of addition and subtraction of the second chopped signal may be varied to adjust the ratio of output voltage to input voltage over a wide range. An energy storage inductor (62) is provided in the high power chopper path to average the voltage addition and subtraction. The high power chopper operation may be intermittently interrupted to limit input current flow during startup, and switches (102,104) provided to discharge energy stored in the inductor (62) into the transformers (52,54) and thereby contribute to the output voltage ($V_{OUT}$).

20 Claims, 4 Drawing Sheets

D.C. CHOPPER REGULATING METHOD AND APPARATUS INCORPORATING BILATERAL REGULATING VOLTAGE PATH

BACKGROUND OF THE INVENTION

1. Field of the Invention

The present invention generally relates to the regulation or conversion of an unregulated D.C. input voltage into a regulated D.C. or A.C. output voltage, and more specifically to a D.C. chopper regulator and regulating method incorporating a bilateral regulating voltage path.

2. Description of the Related Art

D.C. to D.C. regulators or converters are utilized in applications in which a precisely regulated D.C. voltage is required, but the available voltage from a primary D.C. power supply such as a battery varies over a range which is unacceptably large. Many regulator topologies have been proposed in the past, including the basic forward converter or "buck" regulator 10 illustrated in FIG. 1. An unregulated D.C. voltage $V_{IN}$ from a battery 12 is applied through a switch 14 and energy storage inductor 16 to a load 18. The cathode of a diode 20 is connected to the junction of the switch 14 and inductor 16, with the anode of the diode 18 being connected to ground. A smoothing capacitor 22 is connected across the load 18. A control unit 24 periodically closes and opens the switch 14 to "chop" the input voltage $V_{IN}$ applied to the inductor 16.

Figure 1:
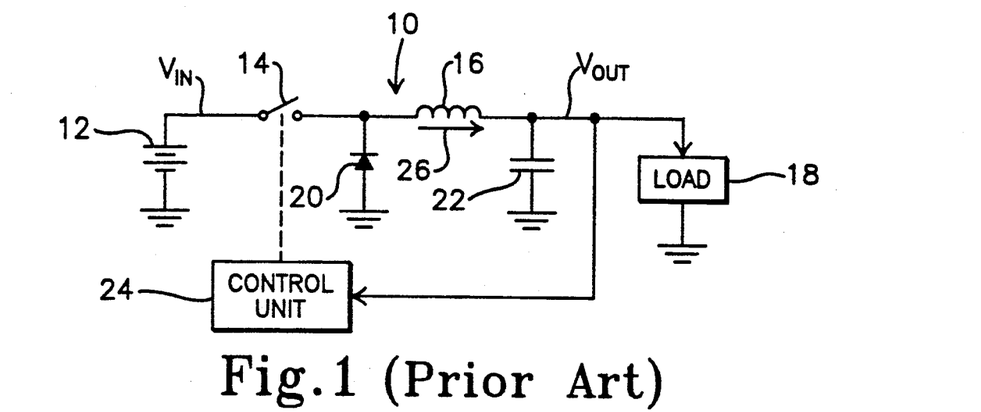
FIG. 1 is an electrical schematic diagram illustrating a basic prior art voltage regulator or converter.

When the switch 14 is closed, current flows from the battery 12 through the switch 14 and inductor 16 to the load 18 in the direction indicated by an arrow 26. The diode 20 is reverse biased and does not conduct. When the switch 14 is opened, the inductor 16 is disconnected from the battery 12. The back electromotive force (EMF) in the inductor 16 forward biases the diode 20 and allows current to continue to flow through the inductor 16 (the energy stored in the inductor 16 causes it to act as a current source) to the load 18 in the direction of the arrow 26, with the forward biased diode 20 completing a closed circuit path to ground.

The inductor 16 and diode 20 constitute a "flywheel" arrangement which causes current to flow continuously from the inductor 16 into the load 18 in the direction of the arrow 26. The load 18 dissipates current continuously, regardless of whether the switch 14 is open or closed. The capacitor 22 charges to the time averaged value of voltage across the load 18, providing a smoothed or regulated D.C. output voltage $V_{OUT}$.

The output voltage $V_{OUT}$ can be regulated by varying the duty cycle (proportion of time the switch 14 is closed during each cycle) of the switch 14. This operation is known in the art as pulse width modulation (PWM). The output voltage $V_{OUT}$ will approach $V_{IN}$ as the duty cycle is increased toward 100%, and will approach zero as the duty cycle approaches 0%. Regulation of the output voltage $V_{OUT}$ to a predetermined value is accomplished by sensing the actual value of $V_{OUT}$, increasing the duty cycle if $V_{OUT}$ drops below the predetermined value, and decreasing the duty cycle if $V_{OUT}$ increases above the predetermined value. In this configuration, the output voltage $V_{OUT}$ cannot exceed the input voltage $V_{IN}$.

The regulator 10 is disadvantageous in that the inductor 16 must accommodate the entire current flow through the load 18, and must necessarily be large and heavy. This is unacceptable in applications where space and weight must be strictly conserved.

The regulator 10 also suffers from inefficiency since the entire load current flows through the diode 20 when the switch 14 is open. The diode 20 introduces a voltage drop of approximately one volt into the circuit, which dissipates power equal to the voltage drop multiplied by the current flow. The dissipative power loss is inversely proportional to the output voltage, and can become excessive in low voltage applications.

Figure 2:
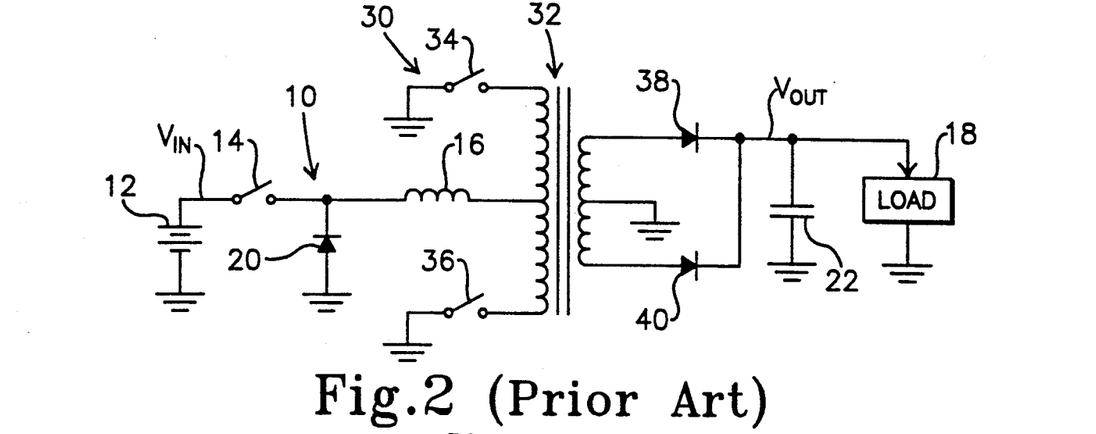
FIG. 2 is similar to FIG. 1, illustrating another prior art regulator.

FIG. 2 illustrates a regulator 30 including the buck regulator of FIG. 1 combined with a "chopper" in a "pushpull", or more accurately a "push-push" arrangement. Like elements are designated by the same reference numerals. In the regulator 30, the inductor 16 is connected to the center tap of a primary winding of a transformer 32, with the opposite ends of the primary winding being connected through chopper switches 34 and 36 to ground. The center tap of a secondary winding of the transformer 32 is grounded, with the opposite ends of the secondary winding being connected to the anodes of rectifier diodes 38 and 40. The cathodes of the diodes 38 and 40 are connected together across the capacitor 22 and load 18.

The switches 34 and 36 constitute a chopper, and are alternatively driven with typically 50% duty cycle. More specifically, the switch 34 is closed when the switch 36 is open and vice-versa. This causes current to be induced in the secondary winding of the transformer 32 in alternating directions, which is rectified and converted to pulsating D.C. by the diodes 38 and 40. The pulsating D.C. is converted to smoothed D.C. by the capacitor 22.

The regulator 32 is capable of producing an output voltage $V_{OUT}$ which is higher than the input voltage $V_{IN}$ due to the provision of the transformer 32. However, the entire load current must still flow through the inductor 16 and diode 20, and there are two switches in the input current path as opposed to one switch in the basic regulator 10. Typically, the switches 14, 34 and 36 are embodied as switching transistors, which introduce voltage drops into the circuit in a manner similar to diodes. This can result in excessive power loss at low input voltages. Most prior art converters have been unable to achieve efficiencies in excess of 88%.

Figure 3:
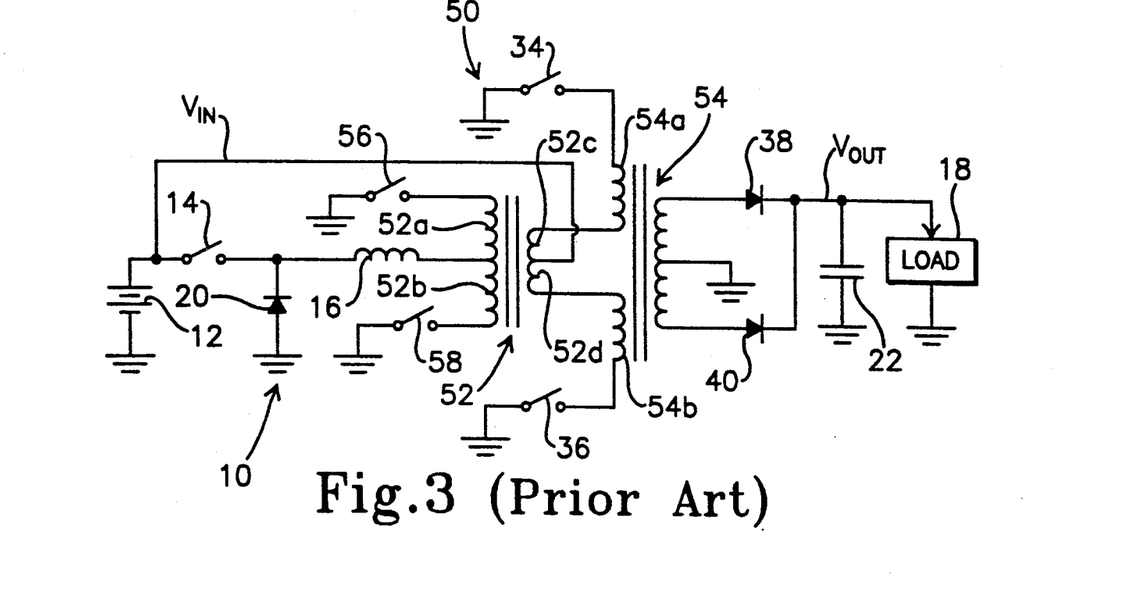
FIG. 3 is also similar to FIG. 2, illustrating a prior art regulator to which the present invention constitutes a direct improvement.

FIG. 3 illustrates a regulator 50 which is disclosed in U.S. Pat. No. 4,943,903, entitled "POWER SUPPLY IN WHICH REGULATION IS ACHIEVED BY PROCESSING A SMALL PORTION OF APPLIED POWER THROUGH A SWITCHING REGULATOR", issued Jul. 24, 1990 to Gilbert I. Cardwell, Jr., who is also one of the present inventors. In the regulator 50, a first transformer 52 has a center-tapped primary winding including two sections 52a and 52b and a center-tapped secondary winding having two sections 52c and 52d. The center tap of the primary winding sections 52a and 52b is connected to the inductor 16, whereas the opposite ends of the sections 52a and 52b are connected through switches 56 and 58 respectively to ground. The center tap of the secondary winding sections 52c and 52d is connected to the battery 12.

A second transformer 54 has two primary windings 54a and 54b and a center tapped secondary winding which is connected to the diodes 38 and 40 in the same manner as in the regulator 30. One end of the winding 52a is connected to ground through the switch 34, whereas one end of the winding 52b is connected to ground through the switch 36. The opposite ends of the windings 54a and 54b are connected to the opposite ends of the windings 52a and 52b respectively.

In operation, the switches 34,56 are driven alternatingly with the switches 36,58 at typically 50% duty cycle. The switch 14 is driven as described above with a variable duty cycle to regulate the output voltage $V_{OUT}$. This is accomplished by producing a voltage at the center tap of the first transformer 52 which increases as the duty cycle of the switch 14 increases.

Closing of the switch 34 or 36 causes voltage $V_{IN}$ to be applied across the series combination of windings 54a,52c or 54b,52d respectively. If the switch 14 is driven with 0% duty cycle, the voltage at the center tap of the primary winding sections 52a and 52b will be zero, and the voltage across the sections 52a and 52b will also be zero. Due to transformer action, the voltage across the secondary winding sections 52c and 52d will also be zero. The voltage across the windings 54a or 54b will be equal to $V_{IN}$. Assuming that the turns ratio of the transformer 54 is unity, $V_{OUT}$ will be equal to $V_{IN}$.

If the switch 14 is driven at a duty cycle approaching 100%, the voltage at the center tap of the primary winding sections 52a and 52b will be substantially equal to $V_{IN}$. Due to transformer action, a voltage will be induced across the winding sections 52c and 52d equal to $V_{IN}$ divided by the turns ratio of the transformer 52. Assuming an exemplary turns ratio of 5:1, the induced voltage across the winding sections 52c and 52d will be $V_{IN}/5$. The voltage appearing across the primary winding section 54a or 54b is thereby equal to $V_{IN}$ (from the battery 12) plus $V_{IN}/5$ (from the winding section 52c or 52d) or $1.2 \times V_{IN}$.

The transformer 52 adds a fraction of the voltage produced by the buck regulator 10, which is continuously variable and increases as the duty cycle of the switch 14 increases, to the input voltage $V_{IN}$. The regulator 50 is advantageous over the regulator 30 in that the main portion of the input current flows through the windings 54a,52c or 54b,52d which are inductive elements and not subject to dissipative loss. The input current flows through only one switch 34 or 36 in the main current path. Only a fraction of the input current (in this case a maximum of 17%) flows through the auxiliary or regulating current path including the regulator 10 and is thereby subject to dissipative losses as described above.

Due to its inherent construction, the regulator 50 is only capable of unilateral regulation. In other words, it is capable of adding a regulating voltage to the input voltage, but not subtracting a regulating voltage therefrom. The turns ratio of the transformer 52 is selected such that the switch 14 will be driven at 50% duty cycle and the regulating voltage appearing across the winding section 52c or 52d will be one-half the maximum regulating voltage when the input and output voltages $V_{IN}$ and $V_{OUT}$ are at their predetermined (nominal, average or center of range) design values. The turns ratio of the transformer 54 is selected such that, with the predetermined design value of $V_{IN}$ plus one-half the maximum regulating voltage applied across the winding section 54a or 54b, the predetermined design value of $V_{OUT}$ will appear across the load 18. In other words, when $V_{IN}$ and $V_{OUT}$ are at the center of their ranges, the regulating voltage will be at the center of its range.

This design is able to achieve efficiencies of 95%, but only if the system has a small input voltage range (e.g. ±5%).

SUMMARY OF THE INVENTION

In a bilateral D.C. chopper voltage regulating method and apparatus embodying the present invention, an unregulated D.C. input voltage is processed by a high power chopper to produce a first chopped signal having the same voltage as the input, and by a low power chopper to produce a second or regulating chopped signal in synchronism with and having a lower voltage than the first chopped signal. The first and second chopped signals are algebraically combined by transformers to produce an A.C. output signal which may be converted to D.C.

The second chopped signal may be controlled to have the same polarity relative to the first chopped signal in which case the voltages add to increase the output voltage, or to have the opposite polarity relative to the first chopped signal in which case the voltages subtract to decrease the output voltage. The second chopped signal will normally be controlled to add part of the time and subtract for the remainder of the time. In this way, the power converter can change the ratio of input voltage to output voltage over a wide range.

An energy storage inductor is provided in the high power chopper path to average the voltage addition and subtraction. The high power chopper operation may be intermittently interrupted to limit input current flow during startup, and switches are provided in the embodiment of FIG. 7 to allow interruption without causing dangerous voltage surges. In addition, the added switches of FIG. 7 discharge energy stored in the inductor into the output transformer and thereby contribute to the output voltage.

The present regulator improves over the prior art regulator illustrated in FIG. 3 in that the energy storage inductor can be smaller than in the prior art regulator for the same regulation range. This is because the present regulator provides bilateral regulation (both addition and subtraction modes), and thereby twice the range of regulation as the prior art regulator using corresponding circuit elements.

The turns ratio of the transformer which produces the regulating voltage may also be one-half that of the corresponding transformer in the prior art regulator, since twice the regulating range can be obtained with the same turns ratio in accordance with the present invention. This enables the size and weight of the transformer to be reduced over the prior art, or the designer may chose to use the same size and weight and achieve wider regulating range.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 4:
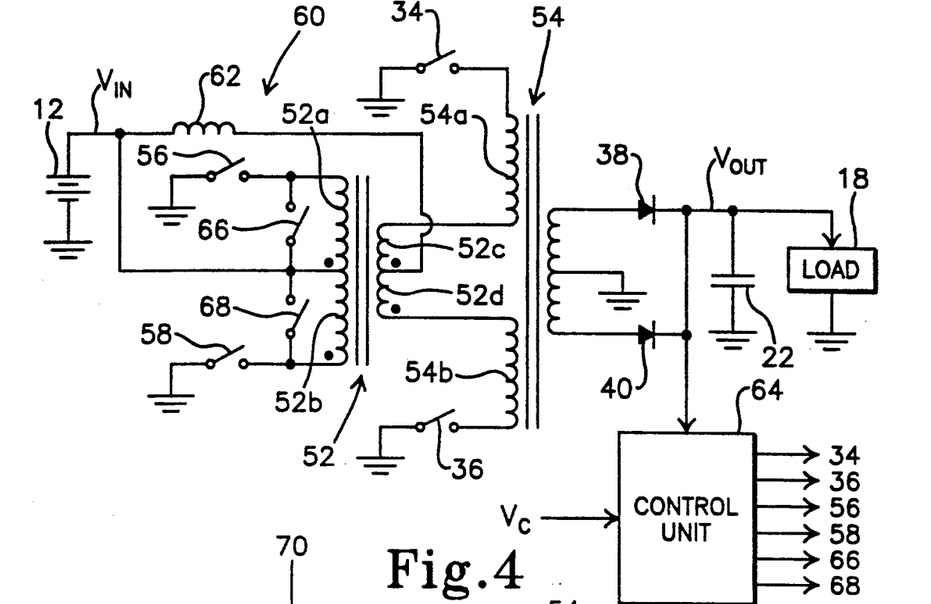
FIG. 4 is an electrical schematic diagram illustrating a voltage regulator or converter embodying the present invention.

A D.C. chopper voltage regulator or converter embodying the present invention is illustrated in FIG. 4 and generally designated as 60. As discussed above, the present regulator 60 is a direct improvement over the prior art regulator 50 illustrated in FIG. 3. In order to enable comparison and appreciation of the present improvements, like elements are designated in FIG. 4 by the same reference numerals used in FIG. 3. It will be understood, however, that the manner in which the elements are interconnected in accordance with the present invention causes the regulator 60 to operate in a fundamentally different manner than the regulator 50.

In the regulator 60, the buck regulator 10 is omitted, and the battery 12 is connected directly to the center tap of the primary winding sections 52a and 52b of the first transformer 52. An energy storage inductor 62 is connected between the battery 12 and the center tap of the secondary winding sections 52c and 52d of the transformer 52. It will be understood that the inductor 16 of the prior art regulator 50 is part of the buck regulator 10 thereof, and is not included in the regulator 60. The inductor 62 of the present regulator 60 does not have a corresponding circuit element in the prior art regulator 50.

The switches 34, 36, 56 and 58 are controlled by a control unit 64 which senses the output voltage $V_{OUT}$, input voltage $V_{IN}$, output current and/or input current, compares the sensed parameter with a command voltage $V_C$ or other command value and controls regulation in accordance therewith. In some applications, the output voltage $V_{OUT}$ is able to vary in response to variations in the command voltage $V_C$. In this case, the output voltage $V_{OUT}$ is compared to the command voltage $V_C$ for regulation. In other applications, the output voltage $V_{OUT}$ is desired to be constant in the presence of a varying input voltage $V_{IN}$. In this case, the output voltage is compared to a reference voltage. In yet other applications, the output current may be the controlling parameter which is to be regulated and the control law built into the control unit can accommodate these variations.

The switches 34 and 36 are typically driven alternatingly with 50% duty cycle, and constitute a first chopper which periodically interrupts the input voltage $V_{IN}$ to produce a first chopped signal in the form of a square wave across the series combination of the winding sections 54a or 54b, 52c or 52d and inductor 62.

The switches 56 and 58 are driven in synchronism (like frequency, variable phase) with the switches 34 and 36, and constitute a second chopper which periodically interrupts the input voltage $V_{IN}$ to produce a second chopped signal in the form of a square wave across the primary winding section 52a or 52b respectively. The second chopped signal is transformed by the transformer 52 and appears across the winding section 52c or 52d as a third chopped signal which is also in synchronism with the first chopped signal, but has a smaller voltage and a polarity which can be the same or opposite relative to the polarity of the first chopped signal.

A simplified manner of viewing the second chopper is to disregard the signals across the primary winding sections 52a or 52b, and consider the switches 56 and 58 in combination with the transformer 52 as producing a second chopped signal across the winding section 52c or 52d. In this case, the second chopped signal corresponds to the third chopped signal described above.

In either case, the signal chopped by the switches 34 and 36 constitutes a main power signal for supply to the load 18. The signal chopped by the switches 56 and 58 constitutes a relatively low power regulating signal, and is algebraically combined with the main power signal by the transformer 52 to provide the regulated output voltage $V_{OUT}$.

The polarities of the winding sections of the transformers 52 and 54 are indicated by the dot winding convention. In the following description, the "opposite end" of a winding section is construed to mean the end of the winding section opposite the dot end thereof.

The regulator 60 is operated in an addition mode by closing the switches 34,58 or 36,56 together, or in a subtraction mode by closing the switches 34,56 or 36,58 together. The operation will be described for the four possible cases as follows.

Case I—addition mode, switches 34,58 closed and switches 36,56 open.

Current flows from the battery 12 to ground through the inductor 62, winding sections 52c and 54a and switch 34. This current flows into the dot end of the secondary winding section 52c, causing induced current to flow out of the dot end of the primary winding section 52b to ground through the switch 58. Since the dot end of the section 52b is negative (ground) with respect to the opposite end (battery 12) of the section 52b, current flows from the battery 12 through the section 52b to ground through the switch 58. Current flows through the section 52c from the battery 12 to ground. This causes the current flow out of the battery 12 to be larger than the average value.

The center tap of the sections 52a and 52b (the opposite end of the section 52b) receives $V_{IN}$ from the battery 12. Thus, the dot end of the section 52b is negative relative to the opposite end. Due to the action of the transformer 52, the dot end of the secondary winding section 52c is negative relative to the opposite end thereof. The result is that a voltage is induced in the section 52c having a value equal to $V_{IN}$ divided by the turns ratio of the transformer 52. Assuming an exemplary turns ratio of 5:1, the voltage induced in the section 52c will be $V_{IN}/5$. This voltage has the same polarity as $V_{IN}$. Thus, the voltage applied to the primary winding section 54a of the transformer 54 is equal to $V_{IN}$ (from the battery 12) plus $V_{IN}/5$ (across the secondary winding section 52c) or $1.2 \times V_{IN}$ minus the voltage across the inductor 62. The voltage across the inductor 62 causes the inductor current to increase.

Case II—subtraction mode, switches 34,56 closed and switches 36,58 open.

Current flows from the battery 12 to ground through the inductor 62, winding sections 52c and 54a and switch 34. This current flows into the dot end of the secondary winding section 52c, urging induced current to flow from ground, through the switch 56, and out of the dot end of the primary winding section 52a into the battery 12. Although the dot end of the section 52a is positive (battery 12) with respective to the opposite end (ground) of the section 52a, current flows through the section 52c from ground into the battery 12, opposite to the direction of applied voltage. This causes the current flow out of the battery 12 to be smaller than the average value.

The switch 56 connects the opposite end of the section 52a to ground. The center tap of the sections 52a and 52b (the dot end of the section 52a) receives $V_{IN}$ from the battery 12. Thus, the dot end of the section 52a is positive relative to the opposite end. Due to the action of the transformer 52, the dot end of the secondary winding section 52c is positive relative to the opposite end thereof. The result is that a voltage is induced in the section 52c having a value equal to $V_{IN}/5$, and the opposite polarity relative to $V_{IN}$. Thus, the voltage applied to the primary winding section 54a of the transformer 54 is equal to $V_{IN}$ (from the battery 12) minus $V_{IN}/5$ (across the section 52c) or $0.8 \times V_{IN}$ plus the voltage across the inductor 62. The voltage across the inductor causes the inductor current to decrease.

Case III—addition mode, switches 36, 56 closed and switches 34, 58 open.

Current flows from the battery 12 to ground through the inductor 62, winding sections 52d and 54b and switch 36. This current flows out of the dot end of the secondary winding section 52d, urging induced current to flow into the dot end of the primary winding section 52a to ground through the switch 56. Since the dot end of the section 52a is positive (battery 12) with respective to the opposite end (ground) of the section 52a, current flows from the battery 12 through the section 52a to ground through the switch 56. Current flows through the section 52d from the battery 12 to ground. This causes the current flow out of the battery 12 to be larger than the average value, similar to Case I.

The center tap of the sections 52a and 52b (the dot end of the section 52a) receives $V_{IN}$ from the battery 12. Thus, the dot end of the section 52a is positive relative to the opposite end. Due to the action of the transformer 52, the opposite end of the secondary winding section 52d is clamped negative relative to the dot end thereof. A voltage is induced in the section 52d having a value equal to $V_{IN}/5$, and the same polarity as $V_{IN}$. Thus, the voltage applied to the primary winding section 54b of the transformer 54 is equal to $1.2 \times V_{IN}$ minus the voltage across the inductor 62. The voltage across the inductor 62 causes the inductor current to increase in the same manner as in Case I.

Case IV—subtraction mode, switches 36, 58 closed and switches 34, 56 open.

Current flows from the battery 12 to ground through the inductor 62, winding sections 52d and 54b and switch 36. This current flows out of the dot end of the section 52d, urging induced current to flow from ground, through the switch 58, and out of the opposite end of the primary winding section 52b into the battery 12. Although the dot end of the section 52b is negative (ground) with respective to the opposite end (battery 12) of the section 52b, current flows through the section 52d from ground to the battery 12. This causes the current flow out of the battery 12 to be smaller than the average value, similar to Case II.

The center tap of the sections 52a and 52b (the opposite end of the section 52b) receives $V_{IN}$ from the battery 12. Thus, the dot end of the section 52b is negative relative to the opposite end. Due to the action of the transformer 52, the dot end of the secondary winding section 52d is clamped negative relative to the opposite end thereof. The result is that a voltage is induced in the section 52d having a value equal to $V_{IN}/5$, and the opposite polarity relative to $V_{IN}$. Thus, the voltage applied to the primary winding section 54b of the transformer 54 is equal $0.8 \times V_{IN}$ plus the voltage across the inductor 62. The voltage across the inductor 62 causes the inductor current to decrease, similar to Case II.

As described above, the switches 34 and 36 are alternatingly driven with 50% duty cycle. During the times the switch 34 is closed, the switch 58 is closed and the switch 56 opened to produce addition mode (Case I), and subsequently the switch 56 is closed and the switch 58 opened to produce subtraction mode (Case II). Voltage regulation is performed by varying the relative duty cycles of the addition and subtraction modes. When the sensed output voltage $V_{OUT}$ (or other controlled parameter) drops below the predetermined design value, the control unit 64 causes the switch 58 (addition mode) to be closed for a relatively longer time than the switch 56 (subtraction mode), such that the regulator 60 operates in addition mode longer than in subtraction mode and the output voltage $V_{OUT}$ increases. The duty cycle is increased as the amount of deviation of the sensed voltage from the predetermined design voltage increases to provide a higher correction for larger amounts of deviation.

When the sensed output voltage $V_{OUT}$ (or input voltage $V_{IN}$) increases above the predetermined design value, the control unit 64 causes the switch 58 (addition mode) to be closed for a relatively shorter time than the switch 56 (subtraction mode), such that the regulator 60 operates in subtraction mode longer than in addition mode. The operation is essentially similar during the times the switch 36 is closed, with the switch 56 being closed for addition mode (Case III) and the switch 58 being closed for subtraction mode (Case IV).

The voltage induced across the secondary winding of the transformer 54 is A.C. In applications where an A.C. output voltage is desired, the diodes 38 and 40 and capacitor 22 are omitted and the output voltage is constituted by this A.C. voltage. The diodes 38 and 40 rectify the A.C. voltage to produce a pulsating D.C. voltage, which is smoothed by the capacitor 22 to produce the smooth D.C. output voltage $V_{OUT}$.

FIG. 4 further illustrates how switches 66 and 68 may be provided to enable alternative methods of driving the regulator 60. The switches 66 and 68 are connected across the winding sections 52a and 52b respectively, and controlled by the control unit 64 in a desired manner. The switch 66 and/or 68 can be closed to short out one or both of the sections 52a and 52b and enable a mode of operation in which neither addition nor subtraction occurs. The inductor loss terms are halved when this option can be used. It is further possible to open both switches 56 and 58 simultaneously to completely open the primary winding sections 52a and 52b.

Figure 5:
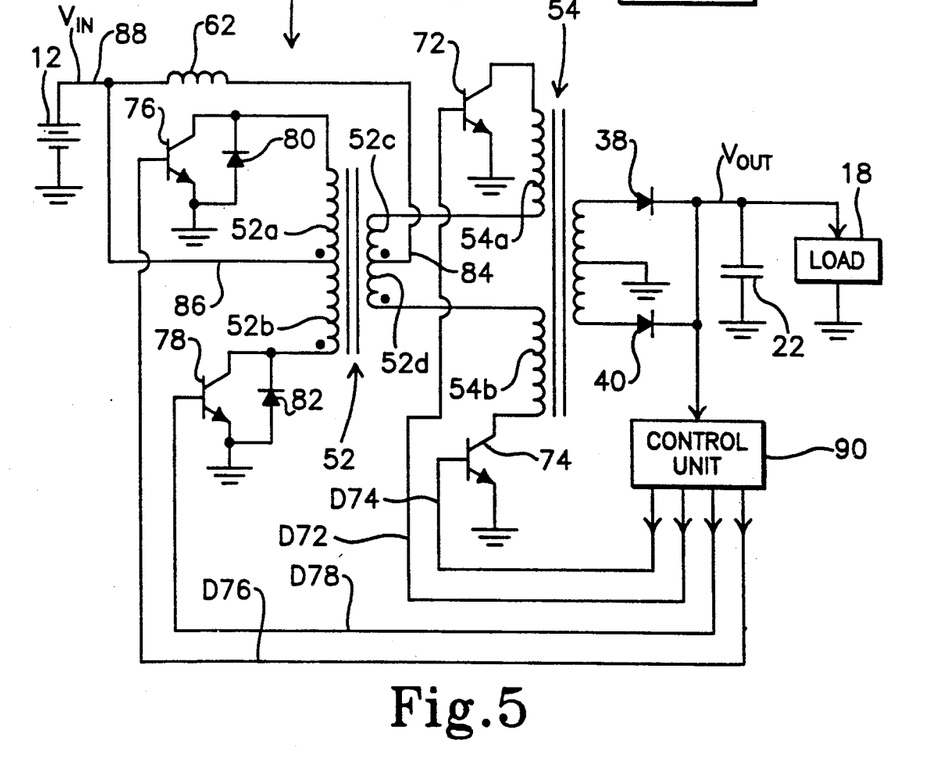
FIG. 5 is similar to FIG. 4, but illustrates the regulator as including transistor switches and antiparallel diodes.

In the regulator 60 it is necessary to close two switches simultaneously to produce an addition mode or a subtraction mode. FIG. 5 illustrates a regulator 70 in which the switches 34, 36, 56 and 58 are replaced by NPN bipolar transistors 72, 74, 76 and 78 respectively. Diodes 80 and 82 are connected across the emitter and collector of the transistors 76 and 78 respectively in anti-parallel relation. This arrangement simplifies the control of the switches since it is necessary to close only switch 72 or 74 to produce a subtraction mode. It will be noted that the bipolar transistors 76 and 78 can be replaced by metal-oxide-semiconductor field-effect transistors (MOSFETs) which inherently include antiparallel diodes, in which case the diodes 80 and 82 can be omitted.

Figure 6:
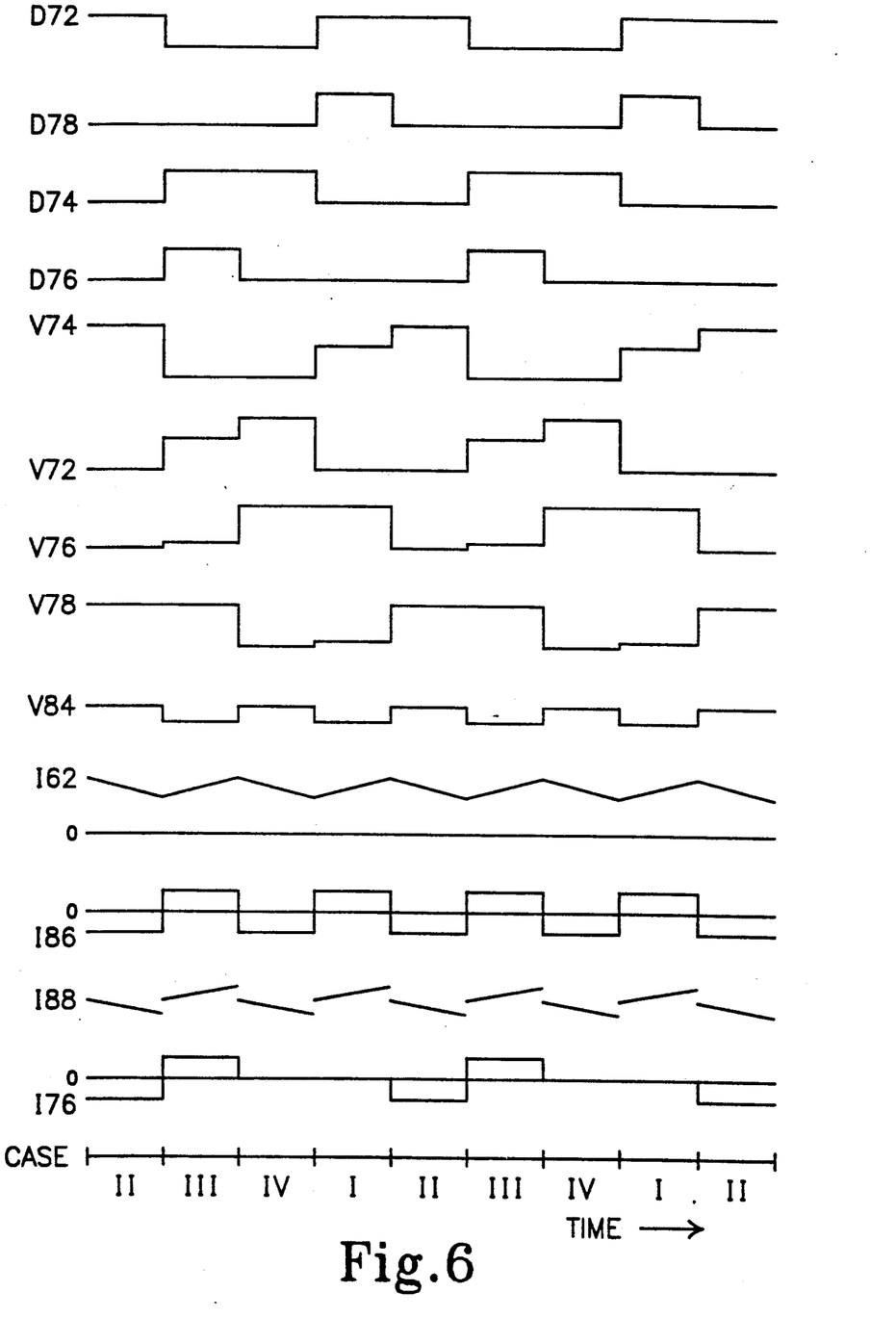
FIG. 6 is a timing diagram illustrating the operation of the regulator of FIG. 4.

The operation of the regulator 70 will be described with reference also being made to the timing diagram of FIG. 6. The drive signals applied by a control unit 90 to the bases of the transistors 72, 74, 76 and 78 are designated as D72, D74, D76 and D78 respectively. The voltages at the collectors of the transistors 72, 74, 76 and 78 are designated as V72, V74, V76 and V78 respectively. Further illustrated are the voltage V84 at the center tap 84 of the secondary winding of the transformer 52, the current I62 through the inductor 62, the current I86 through the center tap 86 of the primary winding of the transformer 52, the current I88 flowing out of the battery 12 and the current I76 flowing through the collector of the transistor 76.

Case I—addition mode, D72 and D78 high.

The transistors 72 and 78 are turned on. Current induced from the secondary winding section 52c into the primary winding section 52b flows out of the dot end of the section 52b through the transistor 78 to ground. The dot end of the section 52b is connected to ground, causing a voltage with the same polarity as $V_{IN}$ to be induced in the section 52c. This operation is equivalent to closing the switches 34 and 58 of the regulator 60.

Case II—subtraction mode, D72 high.

Subtraction mode is produced by turning on only the transistor 72. A voltage is induced across the section 52a such that the dot end is positive relative to the opposite end. Increasing current flow through the section 52c causes the induced voltage in the section 52a to increase until the opposite end of the section 52a is one diode drop more negative than ground. This forward biases the diode 80, enabling current induced from the section 52c to flow from ground through the diode 80 and section 52a into the battery 12.

This causes the dot end of the section 52c to be positive relative to the opposite end, such that the dot ends of the sections 52a and 52b are also positive relative to the opposite ends. Current flows into the dot end of the section 52c, and must flow out of the dot end of the section 52a or into the opposite end of the section 52b. Since the transistor 78 is turned off and the diode 82 is reverse biased, current cannot flow through the section 52b.

The opposite end of the section 52a is effectively connected to ground through the diode 80, causing a voltage with the dot having the same polarity as $V_{IN}$ to be induced in the section 52c. This operation is equivalent to closing the switches 34 and 56 of the regulator 60, with the diode 80 performing the function of the switch 56.

Case III—addition mode, D74 and D76 high.

The transistors 74 and 76 are turned on. Current induced from the secondary winding section 52d into the primary winding section 52a flows from out of the opposite end of the winding 52a through the transistor 76 to ground. The opposite end of the section 52a is connected to ground, causing a voltage with the same polarity as $V_{IN}$ to be induced in the section 52d. This operation is equivalent to closing the switches 36 and 56 of the regulator 60.

Case IV—subtraction mode, D74 high.

Subtraction mode is produced by turning on only the transistor 74. A voltage is induced across the section 52b such that the dot end is negative relative to the opposite end. Increasing current flow through the section 52d causes the induced voltage to increase until the opposite end of the section 52b is one diode drop more negative than ground. This forward biases the diode 82, enabling current induced from the section 52d to flow from ground through the diode 82 and section 52b into the battery 12.

This causes the dot end of the section 52d to be negative relative to the opposite end, such that the dot ends of the sections 52a and 52b are also negative relative to the opposite ends. Current flows out of the dot end of the section 52d, and must flow out of the dot end of the section 52a or into the dot end of the section 52b. Since the transistor 76 is turned off and the diode 80 is reverse biased, current cannot flow through the section 52a.

The dot end of the section 52b is effectively connected to ground through the diode 82, causing a voltage with the opposite polarity relative to $V_{IN}$ to be induced in the section 52d. This operation is equivalent to closing the switches 36 and 58 of the regulator 60, with the diode 82 performing the function of the switch 58.

It will be noted that the collector voltages of the transistors 76 and 78 vary only slightly between the addition and subtraction modes. In addition mode the voltage is ground, whereas in subtraction mode the voltage is one diode drop (approximately one volt) negative of ground. This small difference eliminates one term of switching loss in the regulator 70.

The present regulator 60 improves over the prior art regulator 50 in that the energy storage inductor 62 need only be half as large as the inductor 16 in the regulator 50. This is because the present regulator 60 provides bilateral regulation (both addition and subtraction modes), and thereby twice the range of regulation as the regulator 50 using corresponding circuit elements. The smaller and lighter inductor 62 enables the regulator 60 to be used in applications in which size and weight constraints would preclude the use of the regulator 50.

The turns ratio of the transformer 52 which produces the regulating voltage may also be one-half that of the corresponding transformer in the regulator 50, since twice the regulating range can be obtained with the same turns ratio in accordance with the present invention. This enables the size and weight of the transformer 52 to be reduced over the prior art.

The present regulator 60 also eliminates the buck regulator 10 including the diode 20 which is an inherent element in the prior art regulator 50, thereby eliminating the dissipative loss associated therewith.

A problem inherent in the basic regulator 60 or 70 is that it is difficult to control the initial supply of input voltage $V_{IN}$. When the battery 12 is first connected to the regulator 60 or 70, zero voltage is reflected from the load 18 to the primary winding of the transformer 54. The entire input voltage $V_{IN}$ is effectively applied across the inductor 16 and primary winding sections 54a and 54b which could cause the input current to rapidly increase to a level high enough to destroy the switches 34 and 36. The switches 34 and 36 must both be opened before this occurs in order to limit the input current. However, the back EMF in the inductor 62 is then applied across the switches 34 and 36 which is also high enough to cause severe damage.

Figure 7:
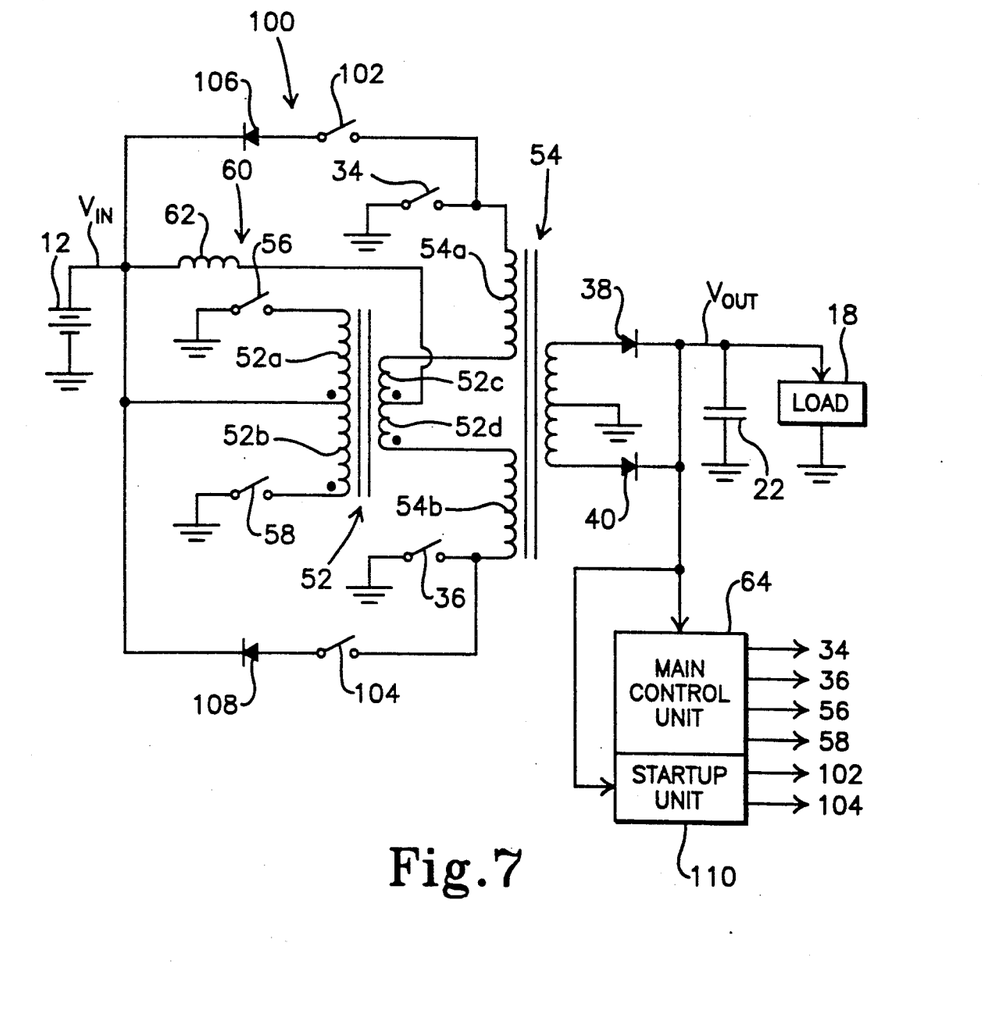
FIG. 7 is also similar to FIG. 4, but illustrates the regulator as including a non-dissipative startup switch arrangement.

FIG. 7 illustrates a regulator 100 in which additional elements are added to the basic regulator 60 to prevent excessive current flow during startup. Switches 102 and 104 are connected between the junction of 54a,34 and the battery 12, and between the junction of 54b,36 and the battery 12 respectively. Diodes 106 and 108 are connected in series with the switches 102 and 104 respectively, with the cathodes of the diodes 106 and 108 being connected to the battery 12. A startup control unit 110 is additionally provided which cooperates with the control unit 64 to control the switches 102 and 104.

During startup, the switches 34, 36, 56 and 58 are alternatingly controlled to operate exclusively in subtraction mode to reduce the input current flow. The switches 34, 36, 56 and 58 are closed for a length of time which is insufficient for the input current to increase to an excessive level. The diodes 106 and 108 are reverse biased during this operation, preventing current from flowing through the switches 102 and 104.

The switches 34, 36, 56 and 58 are then opened and the one of the switches 102 and 104 is closed. Assuming that the switch 102 is closed, the back EMF of the inductor 62 will cause current flow through the sections 52c and 54a, switch 102 and diode 106 in the same direction as the input current. This current is induced into the secondary winding of the transformer 54 and supplied to the load 18. Power dissipation by the load 18 reduces the current flow to a level low enough that the switches 34, 36, 38 and 40 can be closed again to supply more energy into the regulator 100 and increase the output voltage $V_{OUT}$ toward the predetermined design level. The operation is essentially similar with the switch 104 closed.

The operation of the switches 34, 36, 56 and 58 alternates with the operation of the switches 102 and 104 to supply a safe incremental amount of energy into the inductor 62, and then discharge energy from the inductor 62 into the load 18. The timing of closing and opening the switches 102 and 104 is variable over a large range. Typically, the switch 102 will be closed when the switch 34 is opened, and the switch 104 will be closed with the switch 36 is opened. However, if the switches 102 and 104 are turned off slower than the switches 34, 36, 56 and 58, various reactive currents such as induced in the leakage inductance of the sections 54a and 54b will be discharged into the inductor 62 or load 18, thereby providing a nondissipative snubbing function.

The arrangement of FIG. 7 is desirable in that substantially no power is dissipated in the regulator 100 during startup. All of the input power (excluding low order losses) is either supplied directly to the load 18, or stored in the inductor 62 and subsequently supplied therefrom to the load 18.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A regulator for receiving an unregulated D.C. input signal and producing a regulated output signal, comprising:
   first chopper means for periodically interrupting the input signal to produce a first chopped signal;
   second chopper means for periodically interrupting the input signal to produce a second chopped signal which is substantially in synchronism with, and selectively has the same or opposite polarity relative to the first chopped signal;
   combining means for algebraically combining the first and second chopped signals to produce the output signal;
   control means for controlling the second chopper means to select said relative polarity of the second chopped signal and thereby regulate the output signal; and
   energy storage inductor means connected in series circuit with the first chopper means and the combining means.

2. A regulator as in claim 1, in which the second chopper means produces the second chopped signal with a smaller voltage than the first chopped signal.

3. A regulator as in claim 1, in which the control means further controls the second chopper means to vary the duty cycle of the second chopped signal and thereby regulate the output signal.

4. A regulator as in claim 1, in which the combining means comprises transformer means having primary winding means for combining the first and second chopped signals and secondary winding means for transforming said combined first and second chopped signals to produce the output signal as an A.C. signal.

5. A regulator as in claim 1, in which the combining means comprises transformer means for combining and transforming the first and second chopped signals to produce an A.C. voltage, rectifier means for rectifying the A.C. voltage to produce a pulsating D.C. voltage and filter means for smoothing the pulsating D.C. voltage to produce the output signal as a smooth D.C. signal.

6. A regulator as in claim 1, in which:
   the combining means comprises transformer means having primary winding means and secondary winding means; and
   the first and second chopper means are connected to apply the first and second chopped signals in series circuit to the primary winding means.

7. A regulator as in claim 6, wherein the energy storage inductor means is connected in series circuit with the primary winding means.

8. A regulator as in claim 1, in which the control means further comprises startup means for intermittently interrupting operation of the first chopper means to limit current flow into the regulator and discharging energy stored in the inductor means into the primary winding of the transformer means during startup of the regulator.

9. A regulator as in claim 1, in which the first and second chopper means and the combining means have a symmetrical push-push configuration.

10. A regulator as in claim 1, in which:
    the combining means comprises:
       first transformer means including a center-tapped primary winding having first and second sections and a center-tapped secondary winding having first and second sections; and
       second transformer means including a center-tapped primary winding having first and second sections and a secondary winding;
    the first chopper means comprises:
       first switch means connected in series circuit with the first section of the secondary winding of the first transformer means and the first section of the primary winding of the second transformer means for receiving the input signal; and second switch means connected in series circuit with the second section of the secondary winding of the first transformer means and the second section of the primary winding of the second transformer means for receiving the input signal; and the second chopper means comprises:

third switch means connected in series circuit with the first section of the primary winding of the first transformer means for receiving the input signal; and fourth switch means connected in series circuit with the second section of the primary winding of the first transformer means for receiving the input signal.

11. A regulator as in claim 10, further comprising energy storage inductor means connected in series circuit with said center tap of the secondary winding of the first transformer means for receiving the input signal.

12. A regulator as in claim 11, in which the third and fourth switch means each comprise:
switching transistor means; and
diode means connected across the switching transistor means in anti-parallel relation.

13. A regulator as in claim 11, in which the control means comprises means for:
periodically opening and closing the first switch means;
periodically opening and closing the second switch means substantially out of synchronism with the first switch means;
selectively opening and closing the third switch means substantially in synchronism with the first switch means for causing the second chopper means to produce the second chopped signal with the same polarity relative to the first chopped signal;
selectively opening and closing the third switch substantially in synchronism with the second switch means for causing the second chopper means to produce the second chopped signal with the opposite polarity relative to the first chopped signal;
selectively opening and closing the fourth switch means substantially in synchronism with the second switch means for causing the second chopper means to produce the second chopped signal with the same polarity relative to the first chopped signal; and
selectively opening and closing the fourth switch substantially in synchronism with the first switch means for causing the second chopper means to produce the second chopped signal with the opposite polarity relative to the first chopped signal.

14. A regulator as in claim 13, in which:
the control means further comprises startup means for intermittently opening both the first and second switch means substantially in synchronism with each other to limit current flow into the regulator during startup thereof; and
the regulator further comprises startup switch means controlled by the startup means for discharging energy stored in the inductor means into the primary winding of the second transformer means when both the first and second switch means are open.

15. A regulator as in claim 14, in which:
the startup switch means comprises:
fifth switch means connected in series circuit with the inductor means, the first section of the secondary winding of the first transformer means and the first section of the primary winding of the second transformer means; and
sixth switch means connected in series circuit with the inductor means, the second section of the secondary winding of the first transformer means and the second section of the primary winding of the second transformer means; and
the startup means comprises means for:
selectively closing the fifth switch means for discharging said energy stored in the inductor means into the first section of the primary winding of the second transformer means; and
selectively closing the fifth switch means for discharging said energy stored in the inductor means into the second section of the primary winding of the second transformer means.

16. A regulator as in claim 11, in which the control means further comprises fifth switch means for selectively short circuiting at least one of the first and second sections of the primary winding of the first transformer means.

17. A regulator as in claim 11, in which the first transformer means has a turns ratio which is predetermined such that the second chopped signal has a smaller voltage than the first chopped signal.

18. A regulator as in claim 1, in which the control means further comprises means for sensing the voltage of the output signal and controlling the second chopper means to select said relative polarity of the second chopped signal such as to cause said voltage to approach a predetermined value.

19. A method of converting an unregulated D.C. input voltage into a regulated output voltage, comprising the steps of:
(a) periodically interrupting the input voltage to produce a first chopped signal;
(b) periodically interrupting the input voltage to produce a second chopped signal which is substantially in synchronism with, and selectively has the same or opposite polarity relative to the first chopped signal;
(c) transforming the second chopped signal to produce a third chopped signal which has the same polarity as the second chopped signal and a smaller voltage than the first chopped signal;
(d) algebraically combining the first and third chopped signals to produce the output voltage;
(e) sensing the polarity of deviation of the output voltage from a predetermined value; and
(f) selecting said relative polarity of the second chopped signal in accordance with said sensed polarity such that the output voltage approaches the predetermined value.

20. A method as in claim 19, in which:
step (e) further comprises sensing the amount of deviation of the output voltage from the predetermined value; and
step (f) further comprises increasing the duty cycle of the second chopped signal as said sensed amount of deviation increases and vice-versa.

* * * * *